US010576681B2

(12) United States Patent
Smeulders (10) Patent No.: US 10,576,681 B2
(45) Date of Patent: Mar. 3, 2020

(54) MOULD SYSTEM FOR A THERMOFORMING DEVICE, THERMOFORMING DEVICE, AND METHOD FOR THERMOFORMING A PRODUCT

(71) Applicant: BOSCH SPRANG B.V., Sprang-Capelle (NL)

(72) Inventor: Gijsbertus Adrianus Johannes Smeulders, Waalwijk (NL)

(73) Assignee: BOSCH SPRANG B.V. (NL)

(*) Notice: Subject to any disclaimer, the term of this patent is extended or adjusted under 35 U.S.C. 154(b) by 36 days.

(21) Appl. No.: 15/028,878

(22) PCT Filed: Oct. 16, 2014

(86) PCT No.: PCT/NL2014/000039
§ 371 (c)(1),
(2) Date: Apr. 12, 2016

(87) PCT Pub. No.: WO2015/057054
PCT Pub. Date: Apr. 23, 2015

(65) Prior Publication Data
US 2016/0271862 A1 Sep. 22, 2016

(30) Foreign Application Priority Data

Oct. 16, 2013 (NL) .................................. 2011625

(51) Int. Cl.
*B29C 51/32* (2006.01)
*B29C 51/26* (2006.01)
(Continued)

(52) U.S. Cl.
CPC .............. *B29C 51/32* (2013.01); *B29C 51/04* (2013.01); *B29C 51/265* (2013.01); *B29C 51/46* (2013.01);
(Continued)

(58) Field of Classification Search
CPC ..... B29C 51/265; B29C 51/32; B29C 51/262; B29C 51/428; B29C 51/46; B29C 51/04
See application file for complete search history.

(56) References Cited

U.S. PATENT DOCUMENTS 3,753,830 A    8/1973  Cruckshank et al.
6,056,531 A *  5/2000  Furuya .................... B29C 51/08
                                                          264/154
(Continued)

FOREIGN PATENT DOCUMENTS

DE          2751860 A1    5/1979
DE          10000603 A1   5/2001
(Continued)

OTHER PUBLICATIONS

Staple, "Desktop Punch", accessed at staples.com on Jun. 6, 2018. (Year: 2018).*

*Primary Examiner* — Joseph S Del Sole
*Assistant Examiner* — Jamel M Nelson
(74) *Attorney, Agent, or Firm* — Tarolli, Sundheim, Covell & Tummino LLP (57) ABSTRACT

The present invention relates to a mould system for a thermoforming device and to a thermoforming device with such a mould system (1, 2). The invention further relates to a method for thermoforming a product. According to the invention, the mould system is provided with a punching nipple (6) and a cutting plate (5) whereby a product can be at least partially formed and punched in one operating run.

20 Claims, 5 Drawing Sheets

(51) Int. Cl.
*B29C 51/04* (2006.01)
*B29C 51/46* (2006.01)
B29C 51/42 (2006.01)
B29K 105/00 (2006.01)

(52) U.S. Cl.
CPC .......... *B29C 51/262* (2013.01); *B29C 51/428* (2013.01); *B29C 2791/007* (2013.01); *B29C 2793/0018* (2013.01); *B29K 2105/256* (2013.01)

(56) References Cited

U.S. PATENT DOCUMENTS

2006/0099292 A1* 5/2006 Matzenmuller ......... B29C 51/26 425/387.1
2006/0207912 A1* 9/2006 Leroy ................... B65B 55/027 206/531
2011/0147995 A1* 6/2011 Fingerhut ............. B29C 51/085 264/322

FOREIGN PATENT DOCUMENTS

DE 202009015557 U1 3/2011
EP 0686476 A2 12/1995

* cited by examiner

MOULD SYSTEM FOR A THERMOFORMING DEVICE, THERMOFORMING DEVICE, AND METHOD FOR THERMOFORMING A PRODUCT

The present invention relates to a mould system for a thermoforming device and to a thermoforming device with such a mould system. The invention further relates to a method for thermoforming a product.

In the prior art a product is first thermoformed and then transported in pallets to a punching station which arranges holes or recesses.

It is very difficult to place the products in the correct position under the punching device with sufficient precision. The whole system has tolerances, whereby the precision is not perfect. In addition to the position precision of the punched hole, the high investment costs for a product transport system and punching device are a great drawback.

A number of techniques are available for removing material from a product. A first technique comprises of cutting out material. The cutting is here an operation wherein a force is exerted on a blade.

Another technique comprises of punching, wherein a force is exerted on a nipple. The nipple moves here in a cutting plate, wherein the cutting plate and nipple have a smaller clearance. With punching, as opposed to cutting, the material is substantially removed by shearing.

U.S. Pat. No. 6,056,531 describes a mould system as described in the preamble of claim 1 which is used to manufacture plastic automotive components. The upper mould comprises for this purpose a hollow blade which is moved downward for the purpose of cutting through a heated plastic foil. Openings in which the blade can move are for this purpose arranged in the lower mould. Rectangular structures can be cut out using the blade. The cut-out material remains here on a supporting surface which is enclosed by the above stated openings. After being cut out, the cut-out material has to be removed from the lower mould.

In the above system a cutting operation is performed instead of a punching operation. This is because the edges of the openings do not cooperate with the blade as they would in the case of punching.

A drawback of the above system is that the throughput speed is low because the cut-out material has to be removed from the mould after each moulding process.

The object of the present invention is to provide a solution to at least one of the above stated problems.

According to a first aspect of the invention, this object is achieved with the mould system as according to claim 1.

The mould system according to the invention comprises a first mould part provided with at least one form-defining element and a second mould part, wherein the mould parts can move relative to each other for the purpose of clamping a plastic foil and for the purpose of forming a product in the plastic foil using the at least one form-defining element.

The invention is characterized in that the first mould part or the second mould part is provided with a punching nipple and that the other of the first mould part or the second mould part is provided with a cutting plate. The punching nipple and the cutting plate are configured here to co-act for the purpose of punching the product at least partially formed in the plastic foil. The cutting plate further defines an opening through which the punching nipple can move for the purpose of said punching, and the mould system further comprises a channel for discharging punching waste produced during punching, which channel debouches into said opening.

The punching nipple is preferably configured to push the punching waste toward the channel during said punching.

The punching nipple preferably has a solid end part which defines a pushing surface with which the punching nipple pushes against the plastic foil for the purpose of said punching, wherein the solid end part has a small clearance relative to the cutting plate during said movement through the opening.

The mould system can comprise a first energizing unit for energizing the first and/or second mould part for the purpose of performing said relative movement of the mould parts, and a second energizing unit for energizing the punching nipple separately of the first energizing unit for the purpose of said punching. The punching nipple can in this embodiment be controlled independently of the first and second mould parts. The punching nipple can optionally be driven pneumatically, hydraulically and/or mechanically.

According to the invention, a product is provided with a hole or other type of recess during or directly after the thermoforming of the product. The punching is performed here in the thermoforming device, whereby it becomes possible to perform the punching and thermoforming in one operating run.

A further advantage is that the mould system according to the present invention can be applied in existing thermoforming devices. This is because the entire functionality necessary for punching is provided in the mould system. Such mould systems can be placed in existing thermoforming devices in relatively simple manner.

The necessity for a separate punching station is dispensed with the mould system according to the invention. It is further the case that the punching can take place with greater precision because the position of the hole to be punched or the recess to be punched is determined by the mould parts and is thus extremely reproducible and predictable.

It is recommended for the cutting plate to provide an opening or space which enables the movement of the punching nipple embodied as a punch.

A thermoforming device usually comprises an upper mould and a lower mould. These designations corresponds to the position of these moulds during use. According to the invention, the lower mould can be embodied as the first or second mould part. The upper mould is then embodied here as the other of the first or second mould part. According to the invention, the cutting nipple can also be provided in the upper mould or the lower mould. The cutting plate is then provided in the other of the upper mould and lower mould.

The mould system is generally provided with a guide for guiding the relative movement of the mould parts. The mould system can here further comprise a punching guide present in the first mould part or second mould part for the purpose of guiding a punching movement of the punching nipple and/or the cutting plate.

The guiding of the relative movement of the mould parts ensures an accurate relative position of the mould parts, which is for instance necessary for die-cutting a thermoformed product. The mould parts here move partially against each other for the purpose of die-cutting through the plastic foil. By now providing a punching guide in one of the first mould part or the second mould part, the position of the punching nipple and cutting plate is not only precisely defined relative to the mould part in which the punching guide is present, but also indirectly defined relative to the other mould part by means of the above stated guide.

The invention does not preclude both the cutting plate and the punching nipple moving relative to a stationary frame of the thermoforming device during punching.

In an embodiment the punching guide is present in the mould part equipped with the punching nipple and the punching guide is configured to guide the punching movement of the punching nipple toward and away from the cutting plate relative to the rest of this mould part.

An example of a guide and/or a punching guide is a ball guide, a sliding guide or a sleeve guide, with which accuracies of 0-0.025 mm can generally be achieved. The punching guiding can for instance be achieved in that the punching nipple moves in a sleeve which is fixedly disposed relative to the rest of the mould part in question.

The mould system can further be provided with a forming air supply for supplying a gaseous medium under overpressure for the purpose of carrying the plastic foil to at least one form-defining element. A forming air discharge can also be provided for discharging the gaseous medium, wherein it is possible for the supply and the discharge to be identical. In such a case the mould system can comprise a control unit for controlling the punching, the forming air supply and the forming air discharge.

The forming air discharge and/or forming air supply can be provided in the mould part equipped with the punching nipple. The invention however does not preclude the forming air supply and/or forming air discharge being provided in the mould part equipped with the cutting nipple.

The control unit can be configured to start the punching a predetermined amount of time after the gaseous medium is supplied or after or while the gaseous medium is discharged. What is important for here for performing a punching operation in efficient manner is whether the plastic foil has taken on its fixed form due to cooling.

In an embodiment the mould system comprises a closing device for closing the opening prior to said forming of the product. The closing device is also configured to open the opening, for instance prior to the punching. The above stated control unit can further be configured here to control the closing device for the purpose of closing the opening prior to the thermoforming and opening the opening prior to the punching. The closing device can comprise a controllable valve such as a mechanically and/or hydraulically and/or pneumatically controllable valve. This can be formed by a cylinder or other type of body which can move for the purpose of closing or not closing the opening. The closing device here has a closing element for closing the opening which has a cross-section corresponding to the cutting contour associated with the punching nipple and the cutting plate.

To punch a hole it is not always necessary to close the opening prior to at least partial thermoforming of the product. No plastic material will pass through the opening during thermoforming if the hole is for instance sufficiently small. Whether it is necessary to close the opening depends partly on the thickness of the product to be formed, the density and/or viscosity of the plastic made slightly liquid because of heating, and the dimensions of the opening.

In an embodiment the cutting plate is placed in or forms part of the at least one form-defining element.

The second mould part can be provided with a pre-stretcher for pushing the plastic foil toward at least one form-defining element, wherein the punching nipple is at least partially received in the pre-stretcher. It is however also possible for the cutting plate to be placed in or form part of the pre-stretcher.

The second mould part can be provided with a so-called hold-down element. Together with the first mould part, this provides for clamping of the plastic foil. The hold-down element here also seals the plastic foil such that the gaseous medium under overpressure, such as compressed air, can be applied to the foil which is clamped by the hold-down element. The hold-down element is usually embodied here as a sleeve, wherein the compressed air is supplied into the space inside the sleeve.

Because the pre-stretcher comes into contact with the plastic foil and moves close to the at least one form-defining element and the cutting plate during thermoforming it is advantageous to embody the punching nipple in the pre-stretcher. The stroke to be made by the punching nipple is on the one hand limited, and a high accuracy can on the other hand be achieved.

In an embodiment the pre-stretcher comprises a body movable toward the first mould part and provided with an opening which is directed toward the first mould part and in which the punching nipple is received. A hydraulic cylinder, a pneumatic cylinder or an electric servosystem can here be received in the body of the pre-stretcher for the purpose of moving the punching nipple. The pre-stretcher is generally an elongate element and the punching nipple can be received co-axially in the pre-stretcher.

The punching nipple is preferably mounted under bias in the pre-stretcher for the purpose of providing a force, directed away from the first mould part, on the punching nipple. The force will here be overcome by actuation of the punching nipple, and the punching nipple will extend out of the pre-stretcher for the purpose of said punching. Said bias can for instance be achieved using a spring or another type of device providing spring force, such as an air chamber, pressure system or a damper.

In the situation in which it is not actuated, the punching nipple preferably lies in line with the rest of the pre-stretcher. The side of the pre-stretcher which comes into contact with the plastic foil is generally manufactured here from a different material than the punching nipple because different demands are made of the two components. The heat conduction and hardness of the pre-stretcher thus need not be great, while the punching nipple does on the contrary have to be sufficiently hard.

The at least one form-defining element can comprise a structure protruding toward the second mould part.

In another embodiment the at least one form-defining element comprises a forming base for forming a base of the product, wherein the forming base defines a cavity in which the cutting plate is received. This base is preferably movable, for instance by means of a pneumatic cylinder, a hydraulic cylinder or an electric servosystem, for the purpose of knocking out the formed product. The cutting plate can here be fixedly arranged in the first mould part.

In another embodiment the cutting plate and the forming base can be moved as a whole for the purpose of knocking out the formed product, wherein the cutting plate is coupled or fixedly connected to the forming base. It is also possible here for the cutting plate and the forming base to be manufactured from different material.

It is also possible that not the cutting plate but the punching nipple be received in the opening defined by the forming base. In such a system the cutting plate is placed in the second mould, for instance in the pre-stretcher.

According to a second aspect of the invention, the object of the invention is achieved with a thermoforming device as according to claim 20. Such a thermoforming device comprises the above described mould system.

According to a third aspect of the invention, the object of the invention is achieved with a method as according to claim 21. This method comprises the steps of providing a thermoforming device as described above. The method also comprises of moving the mould parts relative to each other for the purpose of clamping a plastic foil, at least partially thermoforming a product in the plastic foil, punching the at least partially thermoformed product using the punching nipple and removing the thermoformed product from the first or second mould part.

The thermoforming and the punching are preferably performed in one operating run.

The method preferably also comprises the steps of supplying a gaseous medium under overpressure for carrying the plastic foil to the first mould part for the purpose of said thermoforming, and discharging the gaseous medium. The punching is here performed a predetermined amount of time after the gaseous medium is supplied or after or while the gaseous medium is discharged.

The present invention can be applied both in forming-punching-moulds and in solely forming moulds.

The invention will be elucidated in more detail hereinbelow with reference to the accompanying figures, wherein.

Figure 1:
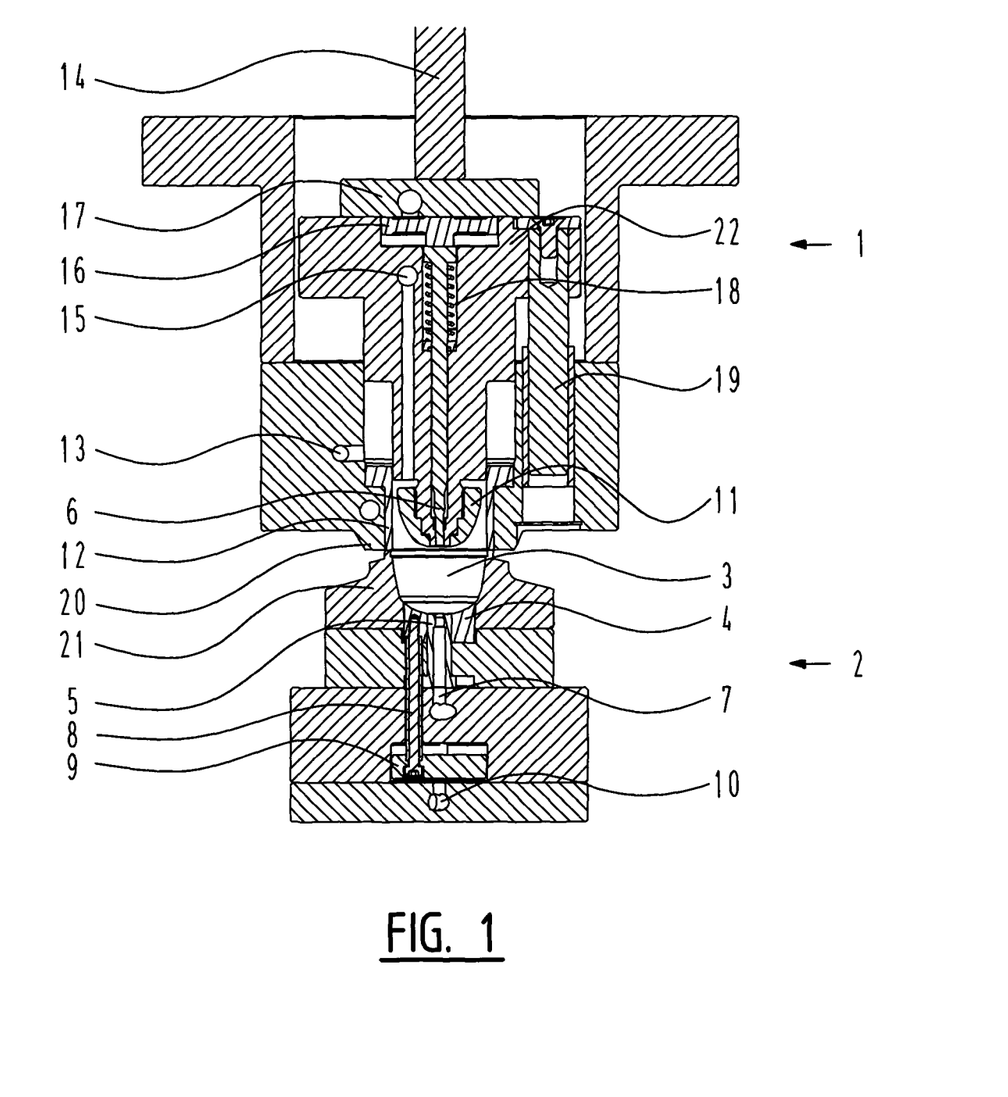
FIG. 1 shows a cross-section of a first embodiment of a mould system according to the present invention.
Figure 2A:
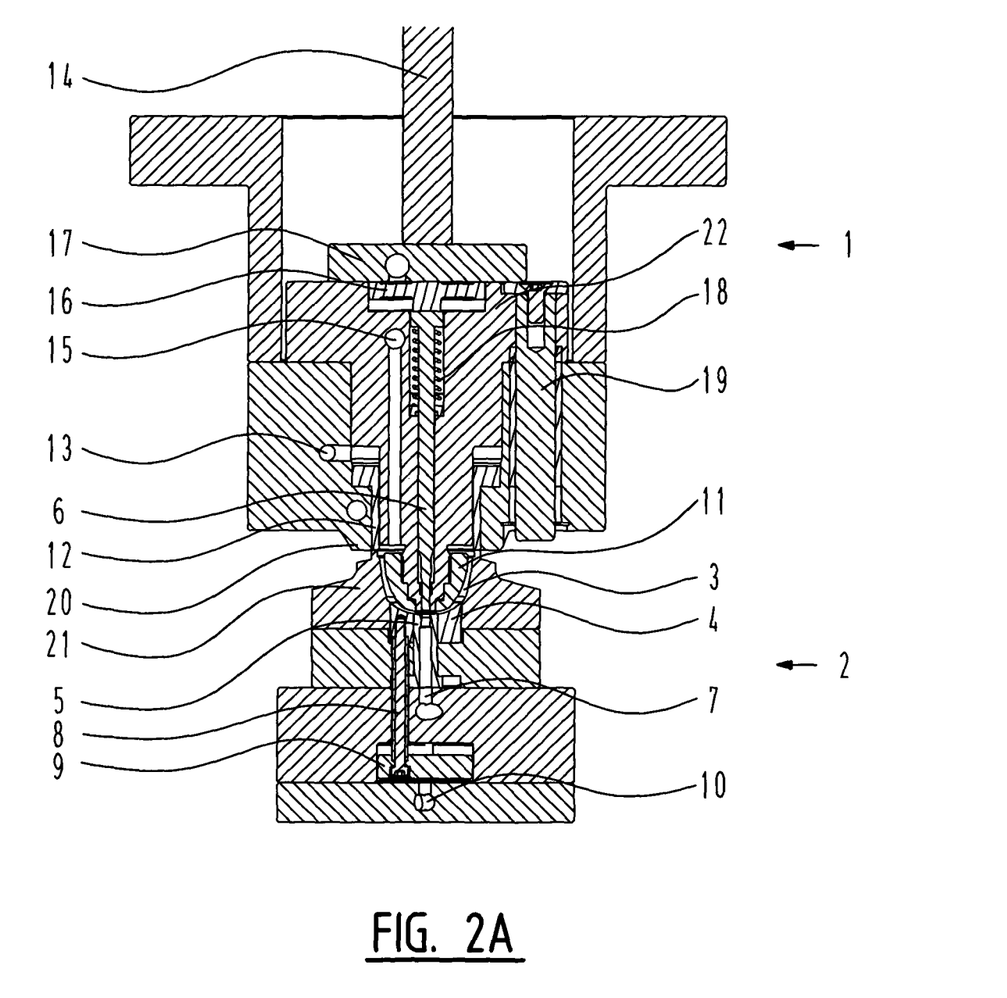
FIGS. 2A and 2B show the embodiment of FIG. 1 in different stages of the thermoforming process.
Figure 2B:
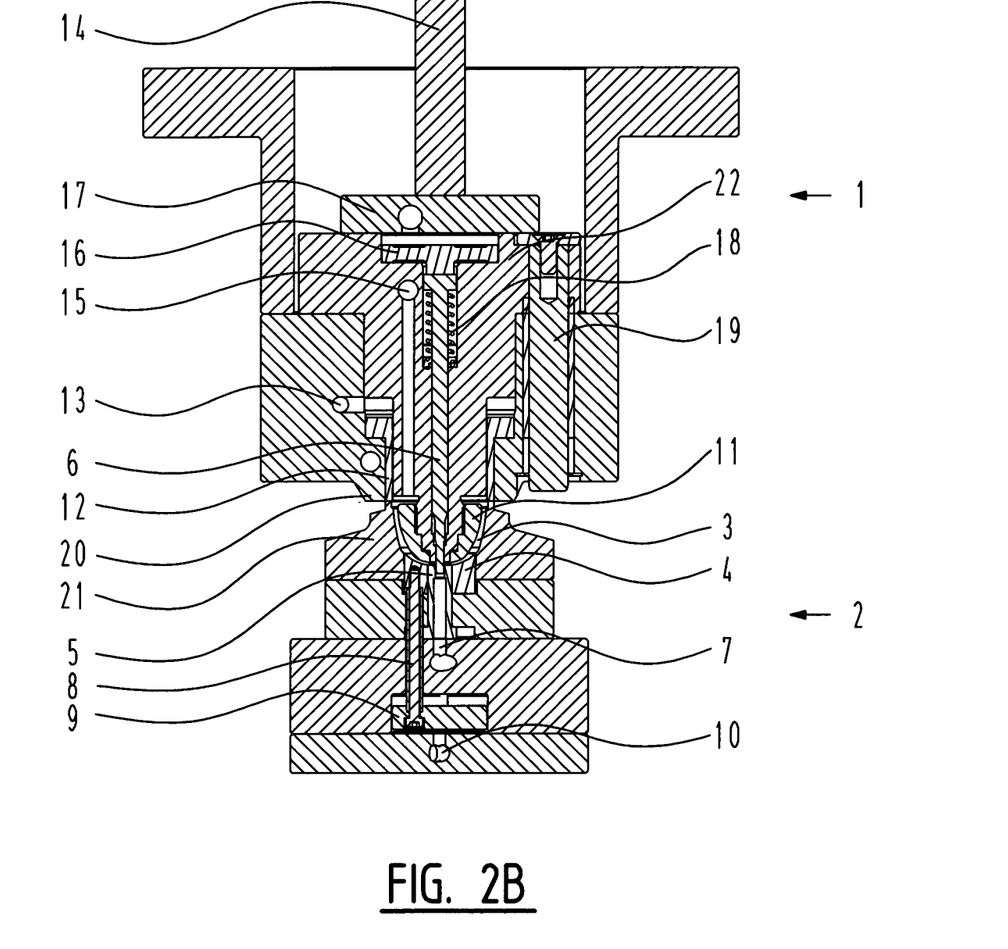

FIG. 1 shows a mould system comprising an upper mould 1 and a lower mould 2. FIGS. 2A and 2B show the same mould system during different stages of the thermoforming process. The heated thermoplastic foil present between upper mould 1 and lower mould 2 is not shown for the sake of clarity.

Lower mould 2 comprises a mould cavity 3 in which a product can be formed. A form-defining element in the form of a base 4 is for this purpose provided on the underside of mould cavity 3. Base 4 defines an opening in which a cutting plate 5 is received. Cutting plate 5 has an opening and can co-act with punching nipple 6 for the purpose of punching for instance a hole into a product at least partially formed in mould cavity 3. FIG. 1 further shows a waste channel 7 for the waste produced during punching. Channel 7 debouches here into the opening in cutting plate 5.

Base 4 is connected by means of a shaft 8 to a cylinder 9. This is actuated by means of for instance compressed air, which is supplied through air supply 10. Base 4 can hereby be moved upward after forming of the product for the purpose of knocking out the formed product. In another embodiment (not shown) the forming base and the cutting plate move as one whole, for instance because they are mutually connected. For the purpose of knocking out the product use can in such a case be made of an ejector plate which is drivable by the thermoforming device and on which a plurality of knock-out pins are mounted. Each knock-out pin is then connected to a forming base. Movement of the ejector plate makes it possible to knock out a plurality of products formed in the mould. Such ejector plates are known from the prior art. A drawback of using a knock-out pin is that such a pin takes up space which, depending on the size of the hole to be punched, may not be available.

Upper mould 1 comprises a pre-stretcher in which punching nipple 6 is co-axially received. The pre-stretcher here has a head 11, which comes into contact with the plastic foil during the thermoforming, and a pre-stretcher body 22. Upper mould 1 further comprises a hold-down element 12.

It can be achieved by for instance supplying compressed air by means of supply 13 that hold-down element 12 moves toward lower mould 2 for the purpose of clamping a heated and deformable plastic foil between upper mould 1 and lower mould 2. After the foil has been clamped and a substantially airtight chamber has been obtained in hold-down element 12 the pre-stretcher is moved downward, see FIG. 2A. Use can be made for this purpose of a mechanically driveable shaft 14. Because the pre-stretcher moves toward mould cavity 3 it presses the plastic foil into mould cavity 3. The walls of mould cavity 3 are generally cooled, whereby the plastic will cool down and will begin to take on a fixed form.

In order to place the plastic properly against the walls of mould cavity 3 use is made of for instance compressed air which is supplied through a supply 15.

The compressed air is discharged, for instance through supply 15 or a separate discharge (not shown), after the product has obtained a more or less fixed form because of cooling.

During or after the cooling, and more particularly just before, during or after the discharging of the compressed air, punching nipple 6 can be moved downward for the purpose of punching the formed product, see FIG. 2B. Punching nipple 6 is for this purpose connected to pneumatic cylinder 16 which can perform an extending stroke by means of compressed air supplied through for instance supply 17. Punching nipple 6 is here under spring tension of spring 18. Other resilient systems can optionally be used, such as a damper or other type of pressure system.

Punching nipple 6 moves through the opening in cutting plate 5 during punching for the purpose of locally cutting through the foil, whereby a circular piece of foil is for instance punched. This piece of foil is collected in waste channel 7.

The pre-stretcher is preferably retracted after punching. Punching nipple 6 and the pre-stretcher will be moved back to the highest position. Hold-down element 12 ensures that the product is not co-displaced upward with punching nipple 6 because it presses on the upper edge of the product. There will be a continuous pressure on hold-down element 12 in order to hold it in the lowest position.

Upper mould 1 and lower mould 2 will then move toward each other for the purpose of separating the product from the surrounding foil. Upper mould 1 is provided for this purpose with a cutting plate 20 which can co-act with a cutting nipple 21 in lower mould 2 for the purpose of cutting through the plastic foil.

Cutting parts 20, 21, 5, 6 are manufactured from hardened steel for good cutting properties and in order to thus achieve a long lifespan.

The situation shown in FIG. 1 corresponds to a punching nipple 6 which is not actuated. The end of punching nipple 6 here lies in line with head 11 of the pre-stretcher such that the forming of the product prior to the punching is not disrupted by a protruding punching nipple 6. Such protruding can however be desired for some products, and is therefore not precluded within the context of the present invention.

FIG. 1 further shows a guide 19 which guides the pre-stretcher relative to the rest of upper mould 1. The punching guide, which provides for the guiding of the punching movement of punching nipple 6, is formed in FIG. 1 by the co-axial arrangement of punching nipple 6 in the pre-stretcher. Use can optionally be made here of already known guiding techniques such as ball guiding, sliding guiding, sleeve guiding. The guide of the pre-stretcher can be at least partially integrated into the pre-stretcher, for instance in that pre-stretcher body 22 is mounted movably in a guide sleeve.

Upper mould 1 and lower mould 2 can move relative to each other by means of a guide (not shown). The position of upper mould 1 relative to lower mould 2 is hereby controlled and precise. The same is therefore the case for the movement of upper mould 1 relative to cutting plate 5 and the opening herein. The pre-stretcher has a precise position relative to the rest of upper mould 1 by means of guide 19. As noted above, guide 19 can also be achieved in that the pre-stretcher moves in a guide sleeve. Punching nipple 6 in turn has a precise position relative to the pre-stretcher because of the guiding in the pre-stretcher. In summary, it can be stated that punching nipple 6 has a precise position relative to the opening in cutting plate 5 because of the different guides. A punching operation can hereby be performed on the at least partially formed product in accurate manner and at a reproducible and controllable position.

Figure 3:
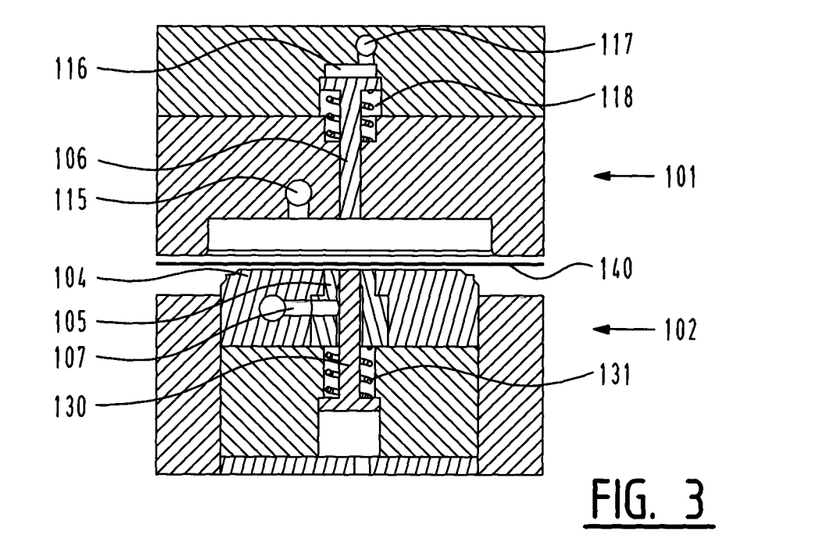
FIG. 3 shows a cross-section of a second embodiment of a mould system according to the present invention.
Figure 4:
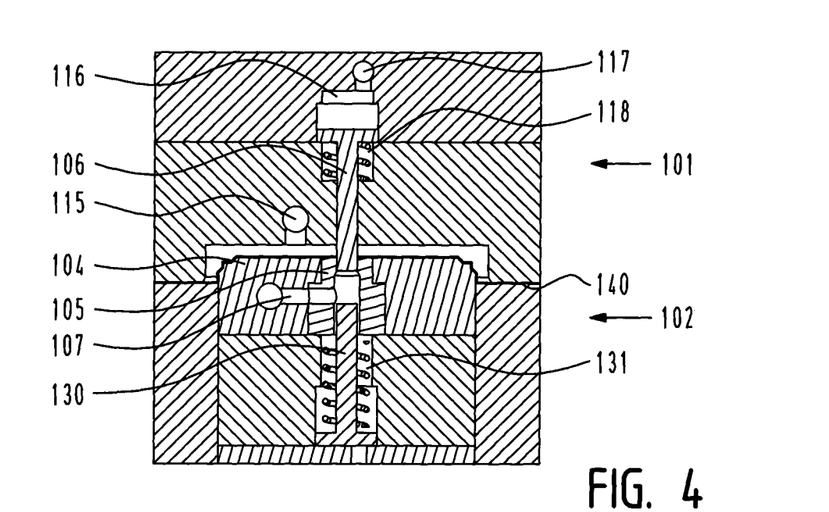
FIG. 4 shows the embodiment of FIG. 3 during the punching operation.

FIG. 3 shows a second embodiment of the present invention. FIG. 4 shows the same mould system during punching. A heated thermoplastic foil 140 present between upper mould 101 and lower mould 102 is visible in both figures.

Lower mould 102 comprises a form-determining element provided in the form of a protrusion 104 which will give foil 140 the form of a lid. Protrusion 104 defines an opening in which a cutting plate 105 is received. Cutting plate 105 has an opening and can co-act with punching nipple 106 for the purpose of punching for instance a hole in a product at least partially formed by protrusion 104. FIG. 3 further shows a waste channel 107 for the waste produced during punching. Channel 107 debouches here into the opening in cutting plate 105. The opening in cutting plate 105 can be closed and opened by a closing part 130. This part is under spring tension of spring 131 such that, in the situation in which it is not actuated, the opening in cutting plate 105 is closed and a flat finish is obtained. This latter in order not to disrupt the forming of the product, although, conversely, such a disruption may be desired for some products. Closing part 130 can be actuated by means of for instance compressed air. The supply for such air is not shown in FIG. 3. The invention does not preclude that closing part 130 is driven in a manner other than for instance hydraulically or electrically.

In contrast to FIG. 1, the embodiment in FIGS. 3 and 4 does not comprise a pre-stretcher. Foil 140 is here only clamped between upper mould 101 and lower mould 102 by moving these toward each other. In order to place the plastic properly against the walls of protrusion 104 use is for instance made of compressed air, which is supplied through a supply 115.

The compressed air is discharged, for instance through supply 115 or a separate discharge (not shown), after the product has obtained a more or less fixed form because of cooling.

During or after the cooling, and more particularly just before, during or after the discharging of the compressed air, punching nipple 106 can be moved downward for the purpose of punching the formed product, see FIG. 4. Punching nipple 106 is connected for this purpose to pneumatic cylinder 116 which can perform an extending stroke by means of for instance compressed air supplied through supply 117. Punching nipple 106 is here under spring tension of spring 118.

Before the punching movement of punching nipple 116 is performed closing part 130 is moved downward, whereby the opening in cutting plate 105 is left clear. This in order to prevent closing part 130 coming into contact with punching nipple 106.

Closing the opening in cutting plate 105 is necessary in the case of the embodiment in FIG. 3. The embodiment shown in this figure can be used for thermoforming a lid with an opening of more than 0.5 cm. If such an opening were not sealed during thermoforming, the plastic would pass through the opening. The final product would hereby be deformed. The opening in cutting plate 5 in FIG. 1 is much smaller, whereby the plastic will not pass into the opening. A separate closing part is not necessary in that embodiment. The invention however does not preclude such a closing part also being applied in the embodiment in FIG. 1.

During the punching, punching nipple 106 moves through the opening in cutting plate 105 for the purpose of locally cutting through foil 140, whereby a circular piece of foil is for instance punched. This piece of foil is collected in waste channel 107. After the thermoforming of the product the foil can be further processed in a separate device, for instance for the purpose of separating the product from the surrounding foil.

Figure 5:
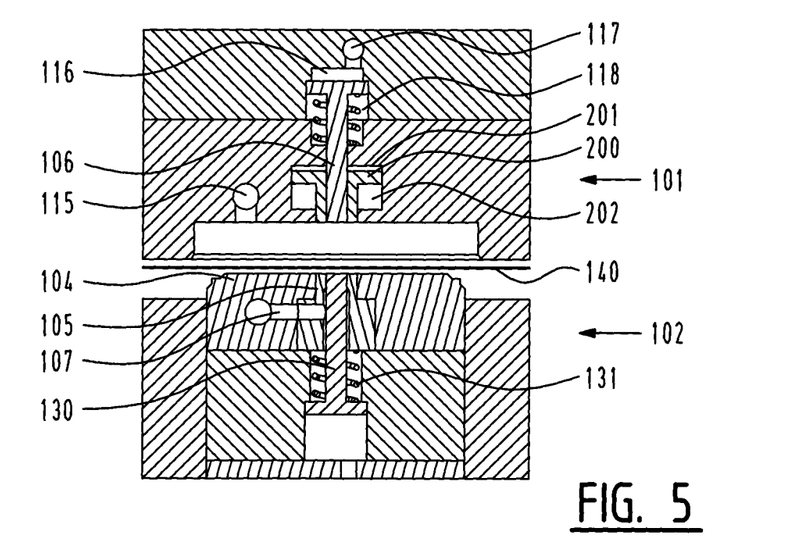
FIGS. 5 and 6 show an embodiment of the present invention with a different closing device.
Figure 6:
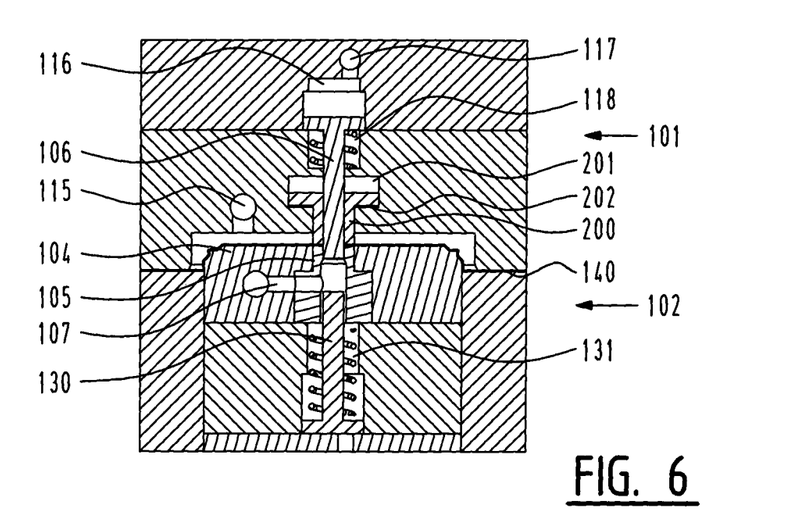

FIGS. 5 and 6 show a further embodiment in which another embodiment of a closing device is applied. FIG. 5 shows a closing part in the form of a hold-down element 200 which is received in upper mould 101. Hold-down element 200 can be moved downward by means of controlling an air pressure in chambers 201, 202. By creating an overpressure in chamber 201 relative to chamber 202 hold-down element 200 will move downward.

Hold-down element 200 has for its object to clamp plastic foil 140 onto cutting plate 105 without substantially cutting through it, see for instance FIG. 6. Because plastic foil 140 is clamped onto cutting plate 105, plastic foil 140 closes waste channel 107. Hold-down element 200 is further a hollow structure which can enclose the opening of waste channel 107. The compressed air, which is supplied through supply 115, will hereby not be able to press plastic foil 140 through the opening of waste channel 107. Hold-down element 200 is preferably placed round punching nipple 106, wherein hold-down element 200 and punching nipple 106 can move relative to each other. The clamping of hold-down element 200 avoids the situation that plastic will pass into waste channel 107 during the forming.

Hold-down element 200 can be used in combination with closing part 130. In many situations hold-down element 200 however provides sufficient closure, so that closing part 130 can be dispensed with.

A further embodiment of a closing device comprises a control unit for controlling the movement of punching nipple 106. This is because a closure of the opening of waste channel 107 is also possible by means of punching nipple 106 itself pressing plastic foil 140 against cutting plate 105, although with little force. Punching nipple 106 here forms a protection against the compressed air coming from supply 115. In this embodiment the movement of punching nipple 106 comprises two steps. A first step comprises of moving punching nipple 106 downward until it touches plastic foil 140 and pushes gently against cutting plate 105. A small force is hereby exerted on plastic foil 140, which suffices for closing the opening of waste channel 107 but which does not suffice for the punching operation. In the second step more force is exerted on punching nipple 106, whereby it will punch plastic foil 140 and whereby punching waste will be pushed into waste channel 107.

It will be apparent to the skilled person that the descriptions of the embodiments in the figures are limited to one single product, but that the present invention is not limited thereto. On the contrary, most thermoforming devices comprise a plurality of mould cavities or protrusions.

Each of these components can be embodied as described above.

The invention is elucidated in the foregoing inter alia on the basis of embodiments thereof. It will be apparent to the skilled person that the invention is not limited to these embodiments but that various modifications are possible without departing from the scope of protection defined by the following claims.

The invention claimed is:

1. A mould system for a thermoforming device, comprising:
    a first mould part including at least one form-defining element, a pre-stretcher having a head, and a hold-down element; and
    a second mould part having a mold cavity,
    wherein the mould parts can move relative to each other for the purpose of clamping a plastic foil with the hold-down element and for the purpose of forming a product in the plastic foil using the at least one form-defining element,
    wherein the first mould part or the second mould part is provided with a punching nipple having a solid end part and that the other of the first mould part or the second mould part is provided with a cutting plate,
    wherein the punching nipple and the cutting plate are configured to co-act for the purpose of punching the product at least partially formed in the plastic foil,
    wherein the cutting plate defines an opening through which the punching nipple can move for the purpose of said punching,
    wherein the head of the pre-stretcher moves toward the mold cavity to press the plastic foil into the mold cavity and the solid end part of the punching nipple pushes against the plastic foil in the mold cavity to punch a hole in the plastic foil, and
    wherein the solid end part has a small clearance relative to the cutting plate during said movement through the opening,
    the mould system further comprising a channel for discharging punching waste produced during punching, which channel debouches into said opening.

2. The mould system as claimed in claim 1, wherein the punching nipple is configured to push the punching waste toward the channel during said punching.

3. The mould system as claimed in claim 1, further comprising a first energizing unit for energizing the first and/or second mould part for the purpose of performing said relative movement of the mould parts, and a second energizing unit for energizing the punching nipple separately of the first energizing unit for the purpose of said punching.

4. The mould system as claimed in claim 1, wherein the mould system is configured to perform the thermoforming of the product and the punching during one operating run.

5. The mould system as claimed in claim 1, further comprising a guide for guiding the relative movement of the mould parts and a punching guide present in the first mould part or second mould part for the purpose of guiding a punching movement of the punching nipple and/or the cutting plate.

6. The mould system as claimed in claim 5, wherein the punching guide is present in the mould part equipped with the punching nipple and wherein the punching guide is configured to guide the punching movement of the punching nipple toward and away from the cutting plate relative to the rest of this mould part.

7. The mould system as claimed in claim 1, further comprising:
    a forming air supply for supplying a gaseous medium under overpressure for the purpose of carrying the plastic foil to at least one form-defining element;
    a forming air discharge for discharging the gaseous medium; and
    a control unit for controlling the punching, the forming air supply and the forming air discharge, wherein the control unit is configured to start the punching a predetermined amount of time after the gaseous medium is supplied or after or while the gaseous medium is discharged.

8. The mould system as claimed in claim 7, wherein the forming air discharge and/or the forming air supply is provided in the mould part equipped with the punching nipple.

9. The mould system as claimed in claim 1, further comprising a closing device for closing the opening prior to said forming of the product.

10. The mould system as claimed in claim 7, wherein the control unit is further configured to control the closing device for the purpose of closing the opening prior to the thermoforming and opening the opening prior to the punching.

11. The mould system as claimed in claim 1, wherein the cutting plate is placed in or forms part of the at least one form-defining element.

12. The mould system as claimed in claim 1, wherein the punching nipple is at least partially received in the pre-stretcher.

13. The mould system as claimed in claim 12, wherein the pre-stretcher comprises a body movable toward the first mould part, which body is provided with an opening which is directed toward the first mould part and in which the punching nipple is received.

14. The mould system as claimed in claim 13, wherein a hydraulic cylinder, a pneumatic cylinder or electric servo-system is received in the body of the pre-stretches for the purpose of moving the punching nipple.

15. The mould system as claimed in claim 14, wherein the punching nipple is mounted under bias in the pre-stretcher for the purpose of providing a force, directed away from the first mould part, on the punching nipple.

16. The mould system as claimed in claim 1, wherein the at least one form-defining element comprises a structure protruding toward the second mould part.

17. The mould system as claimed in claim 1, wherein the at least one form-defining element comprises a forming base for forming a base of the product, wherein the forming base defines a cavity in which the cutting plate is received.

18. The mould system as claimed in claim 17, wherein the forming base can be moved for the purpose of knocking out the formed product and wherein the cutting plate is fixedly received in the first mould part.

19. The mould system as claimed in claim 17, wherein the cutting plate and the forming base can be moved as a whole for the purpose of knocking out the formed product, wherein the cutting plate is coupled or fixedly connected to the forming base.

20. A thermoforming device comprising the mould system as claimed in claim 1.

* * * * *